United States Patent [19]
Fischer

[11] 3,724,923
[45] Apr. 3, 1973

[54] DIGITAL CORRELATION PATTERN TRACKER

[75] Inventor: John J. Fischer, Fullerton, Calif. 92632

[73] Assignee: North American Rockwell Corporation, El Segundo, Calif.

[22] Filed: Apr. 4, 1968

[21] Appl. No.: 720,435

[52] U.S. Cl. ............... 356/158, 250/202, 356/152
[51] Int. Cl. ............................................. G05b 1/00
[58] Field of Search......... 88/14 E, 1 HU; 343/5 MM; 250/202–203, 219 D; 244/3.17; 356/141, 152, 102, 158

[56] References Cited

UNITED STATES PATENTS

| | | | |
|---|---|---|---|
| 3,416,752 | 12/1968 | Hembree | 244/3.17 |
| 3,244,889 | 4/1966 | Preston et al. | 250/203 X |
| 3,290,506 | 12/1966 | Bertram | 250/203 |
| 3,372,890 | 3/1968 | Bogard et al. | 244/3.17 |

*Primary Examiner*—Benjamin A. Borchelt
*Assistant Examiner*—H. A. Birmiel
*Attorney*—L. Lee Humphries

[57] ABSTRACT

A pattern tracker which utilizes orthogonal photosensor strips fixed in the image plane of a tracking telescope. The telescope is alternately dithered to cause first the one and then the other photosensor strip to scan the pattern producing a line scan in one coordinate alternated with a line scanned in a perpendicular coordinate. Each photosensor's output is divided into time increments and each such increment is digitized by comparison to some threshold value thus producing a digital word describing the light intensity silhouette of the pattern scanned in each of two orthogonal coordinates. The above process is repeated at a later time, the digital words produced from the latter scan are correlated with those from the prior scan to determine pattern movement between scans.

15 Claims, 5 Drawing Figures

DIGITAL CORRELATION PATTERN TRACKER

BACKGROUND OF THE INVENTION

1. Field of the Invention

The present invention relates to a pattern tracker for measuring the motion in two axes of an arbitrary light pattern and more particularly to a device which provides the two axis measure of pattern motion from an array of only two strip shaped photosensitive elements.

2. Description of Prior Art

In sensing and tracking an arbitrary light pattern, difficulties have long been encountered in developing a system having a sensor portion simple enough to provide high performance reliability and a computer portion small enough to satisfy size and weight requirements which may be presented by, for example, airborne systems.

Since the pattern to be tracked is arbitrary, that is, not necessarily predefined, as where you are tracking an unknown terrain pattern, the sensor portion of the tracking system must be capable of sensing a wide variety of configurations.

A pattern to be tracked is typically imaged by a conventional focusing means, such as a telescope, into a reticle or photosensor array in the focal plane. In one prior art approach, the image is divided into $n$ resolution elements in each axis or a total of $n^2$ elements. The pattern is then defined by the light level at each of the $n^2$ resolution element positions. The tracking technique utilized involves measuring and storing the intensity at each of the $n^2$ element positions at a time $t_1$ and then repeating the process at a later time $t_2$. The two stored patterns would then be shifted with respect to each other until the position of maximum cross-correlation were found. The amount of shift required in each axis to achieve maximum cross-correlation would then be a measure of the motion in time $t_2 - t_1$. This technique is feasible but requires considerable sensor complexity and electronic capacity as a minimum of $n^2$ sensor elements are required to be arrayed and a computer system capable of storing and comparing a minimum of $2n^2$ information bits is required. In addition, the complexity of the correlation process is further increased by relative rotation of the photosensor array with respect to the tracked pattern between successive measurements.

SUMMARY OF THE INVENTION

According to the present invention, a unique approach to the two axis measurement of motion of an arbitrary light pattern is undertaken wherein separate orthogonal photosensor strips are fixed in the image plane of a focusing means. The vertical (Y) strip is caused to be driven across the image of the pattern at a known rate in the horizontal (X) direction while the horizontal (X) strip is driven across the image of the pattern at a known rate in the orthogonal (Y) direction.

As each X and Y scan progresses, the output of the respective photosensor is compared at intervals of time (representing increments in X or Y) to some threshold electrical current value. If the current exceeds the threshold, a "1" is written in a bit position in a digital register corresponding to that time increment. If the current falls below the threshold, a "0" is written in the corresponding bit position. Thus, a digital word is formed describing the light intensity silhouette of the area scanned in each of two orthogonal coordinates. If each scan is broken up into $n$ time intervals, each digital word will be $n$ bits long.

Each time the same strip is scanned, the digital word produced is compared to the corresponding word from the previous scan cycle. The comparison process carried out is modulo-two addition which matches each succeeding scan to the previous scan to determine the displacement of the silhouette pattern from the last scan. The X and Y correlation matching can be carried out independently and displacement of the landmark pattern determined in two orthogonal coordinates from each scan cycle to the succeeding scan cycle. Thus, only two strip shaped sensor elements need, at a minimum, be arrayed, and the associated computer system need only have the capacity to store and compare $2n$ information bits.

OBJECTS

It is therefore an object of the present invention to provide a novel pattern tracker.

It is a further object of the present invention to provide a pattern tracker characterized by simplicity of the required sensor array and associated electronic circuitry.

It is a still further object of the present invention to provide a pattern tracker wherein only a minimum number of sensor elements are required.

Still other objects, features and attendant advantages of the present invention will become apparent to those skilled in the art from a reading of the following detailed description of several embodiments constructed in accordance therewith, taken in conjunction with the accompanying drawings and wherein:

DESCRIPTION OF THE PREFERRED EMBODIMENTS

Figure 1:
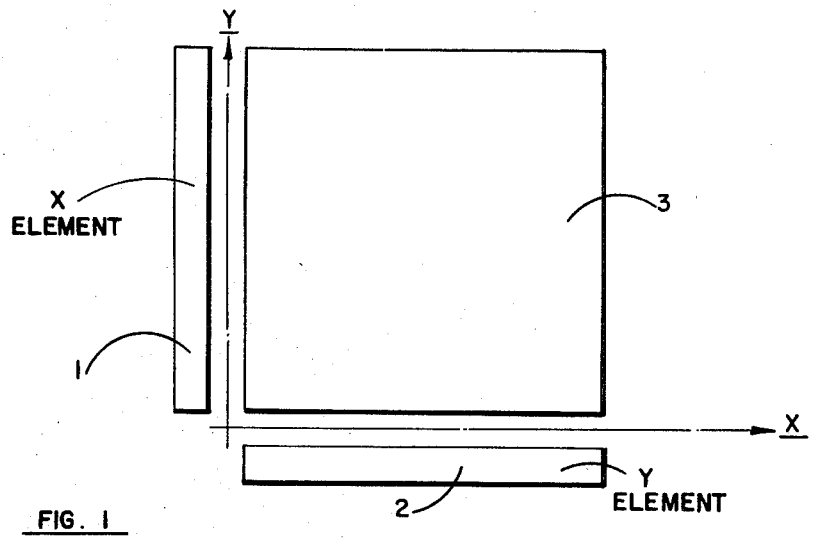
FIG. 1 is a schematic diagram of a sensor configuration constructed in accordance with the principles of the present invention wherein an orthogonal pair of sensor strips are disposed so as to alternately sweep the same pattern.

Referring to FIG. 1, there is illustrated a photosensor array constructed according to the principles of the present invention. Separate photosensor strips 1 and 2 are orthogonally disposed in image plane 3. Image plane 3 may be any surface upon which an image or representation of an arbitrary pattern is present. Sensors 1 and 2 may preferably be supported by a substrate member such as, for example, ceramic or glass. The two photoelectric surfaces may be placed directly on the substrate member. Alternately, a surface of photoelectric material may be placed over the entire surface of the substrate and then masked with a material such as gold to display the two orthogonal surfaces 1 and 2 of photoelectric materials. Electrical insulation of the two exposed strips would be required. The photosensor material may, for example, comprise cadmium sulfide, silicon, or other photosensor material, the choice to be determined on the basis of the anticipated frequency spectrum of the pattern to be tracked. The present invention is not limited to visible wavelength pattern tracking and, therefore, sensor materials capable of sensing wavelengths in the ultraviolet or infrared regions may also be used.

Figure 4:
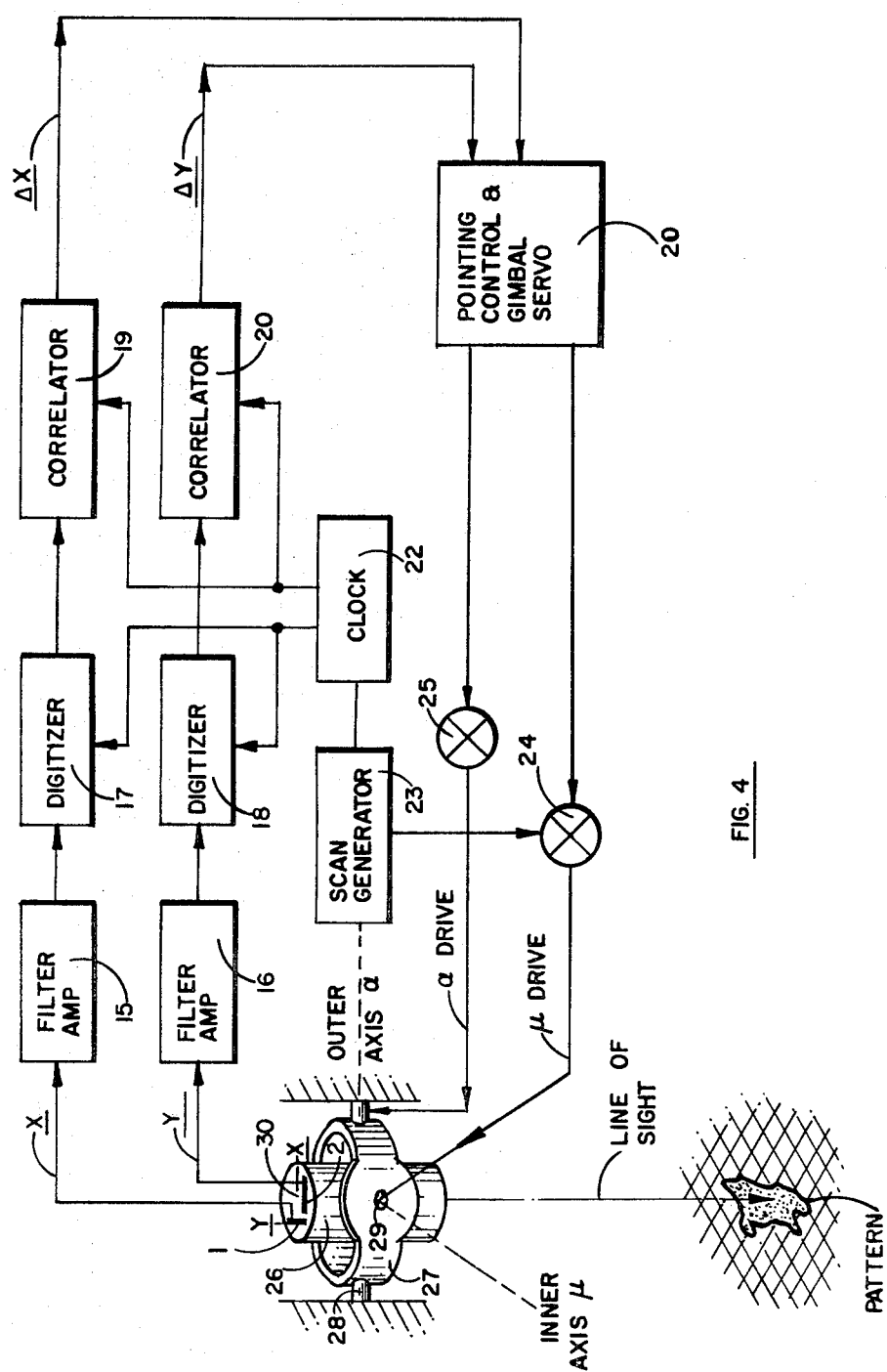
FIG. 4 is a functional block diagram of a pattern tracking system constructed from known electronic components in accordance with the principles of the invention to generate signals which are indicative of the position of an arbitrary pattern on the focal plane of a focusing means and drive the focusing means responsive to the indicated position.

Referring now to FIG. 4, sensor strips 1 and 2 are shown disposed in image plane 30 of telescope 26. Telescope 26 is supported about inner gimbal axis $\mu$ and outer gimbal axis $\alpha$. Telescope 26 is initially pointed at a desired area by pointing control and gimbal servo 21 which provides signals to inner and outer axis torquers 24 and 25, respectively. Scan generator 23 then provides signals to torquers 24 and 25 which drives inner gimbal axis $\mu$ so that the pattern image moves at a known rate synchronized by system clock 22 across photocell 1 in the X direction, and outer gimbal axis $\alpha$ so that the pattern image moves across photocell 2 at a known rate synchronized by system clock 22 in the Y direction. As each half scan (X then Y) progresses, the output of each photosensor is first amplified and then filtered in filter-amplifiers 15 and 16. The characteristics of the filtering portion of 15 and 16 will depend upon the system requirements. The higher frequencies more sharply define a pattern but contain a higher component of noise than do the lower frequencies which, however, do not convey the sharp details of a pattern. This mitigates towards choosing an intermediate frequency range. The outputs of filter-amplifiers 15 and 16 are fed into digitizers 17 and 18. Referring to the X scan, digitizer 17 compares the output of photosensor 1 at intervals of time (representing increments in X) synchronized by system block 22 to some threshold electrical current value. The threshold level may be pre-set or controlled by the analog signal by using an rms to dc converter contained in digitizer 17 to set the threshold. This assures that the output signal will always contain an appropriate ratio of signals above and below the threshold value. If the signal exceeds the threshold, a "1" is written in a bit position in a digital register, contained in correlator 19, corresponding to the time increment involved. If the current falls below the threshold, a "0" is written in the corresponding bit position in correlator 19. Thus, a digital word describing the light intensity silhouette of the area scanned in one coordinate (X) is produced.

Each element of this silhouette is a function of the total amount of light impinging upon the entire photosensor strip 1 during the time increment.

Figure 2:
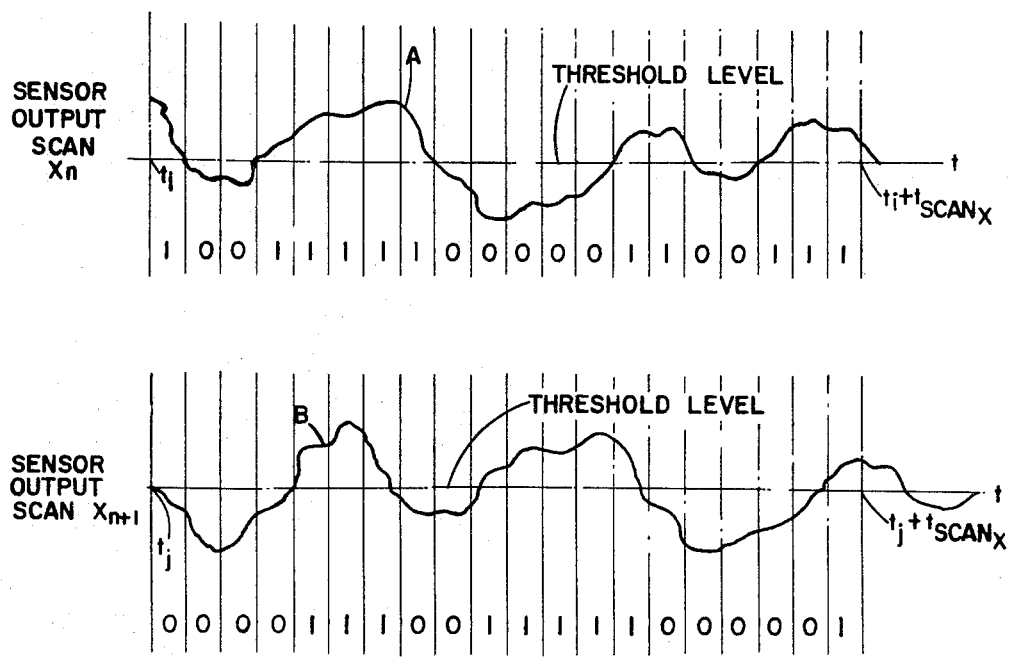
FIG. 2 is a sketch of a pair of typical waveforms which might be generated by a sensor of FIG. 1 during two successive scans.

Illustrated in FIG. 2 are two typical waveforms produced by successive scans of photosensor strip 1. Waveform A is the waveform resulting from scan $X_n$ commencing at time $t_i$ and concluding at time $t_i + t_{scan}$. $t_{scan}$ is the time required for a single scan in the X direction. As illustrated in FIG. 2, the waveform is segmented into equal increments of time and compared during each such time increment to a threshold level. The bit value for each time increment is shown below the waveform. For convenience, twenty such increments have been illustrated. Waveform B illustrates a typical output for scan $X_{n+1}$ commencing at time $t_j$ and terminating at time $t_j + t_{scan}$. Referring once again to FIG. 4, each time the strip 1 is scanned the digital word produced is stored in a register in correlator 19 and compared to the corresponding word from the previous scan cycle. The comparison process carried out is termed modulo-two addition and is designed to determine the displacement of the silhouette pattern from the last scan. The process may be described as follows. Each bit of a word is compared in correlator 19 to the corresponding bit of the corresponding word from the previous cycle, independent of all other bits. If the values of the bits compared are alike, a "0" is written for the sum; if different, a "1" is written. The process is equivalent to disabling the carry capability of a digital add register and simply adding. The number of "1's" is then counted and stored in the correlator. The second word is now shifted one bit and the process repeated. Additional shifts are made and differences noted. The pattern size and number of intervals into which each scan is broken is selected so that an appreciable word overlap exists at all times because the information content diminishes as the difference word gets shorter. This is accomplished by designing the scan pattern, word length, and bit size in accordance with the maximum anticipated displacement per scan cycle and the resolution desired. When the normalized differences are found and "1's" counted for all allowable shifts, the best match is the position which produced a minimum number of "1's". The process is repeated for each successive scan by shifting the last word to the old word position and comparing it with the new word.

The above procedure is similarly carried out with respect to photosensor strip 2. The correlator outputs are digital numbers indicating the shifts required to match words from successive scans. These shifts represent displacements along each respective axis. It can be seen that the X and Y correlation matching can be carried out independently and displacement of the landmark pattern determined in two orthogonal coordinates from each scan cycle to the succeeding scan cycle.

Figure 5:
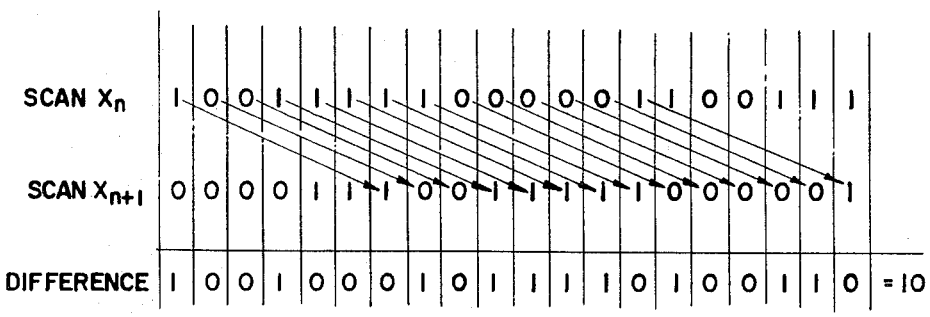
FIG. 5 is a graphical illustration of the correlation technique employed to correlate the waveforms of FIG. 2.

The correlation technique for curves A and B of FIG. 2 is illustrated in FIG. 5. It can there be seen that six shifts would be required to match the words from the succeeding scans. The pattern, therefore, has moved a distance $R \times t_{scan}/20 \times 6$ along the X axis between scan $X_n$ and scan $X_{n+1}$, where R is the distance moved by the X sensor during one time increment ($t_{scan}/20$).

Referring again to FIG. 4, the outputs from correlators 19 and 20 are fed into pointing control and gimbal servo 21 to cause the telescope 26 to center on the pattern after each successive scan or series of scans. In addition, the angle of the line of sight to the pattern or the angular rate of change of the line of sight to the pattern may be obtained by mounting conventional angle readouts, not illustrated, on gimbal axes $\mu$ and $\alpha$.

While the invention has been described in relation to a single threshold, to which the output of each photosensor is compared during discrete intervals of time, such is not a necessary constraint. Two or more discrete threshold levels may be concurrently utilized. The output of each photosensor would then be compared during each discrete interval of time to each of the various threshold levels and a multi-bit word stored in the register representing each interval of time. The correlator would then compare each multi-bit word from a successive scan to the multi-bit word of the preceding scan in the same manner as previously described.

Figure 3:
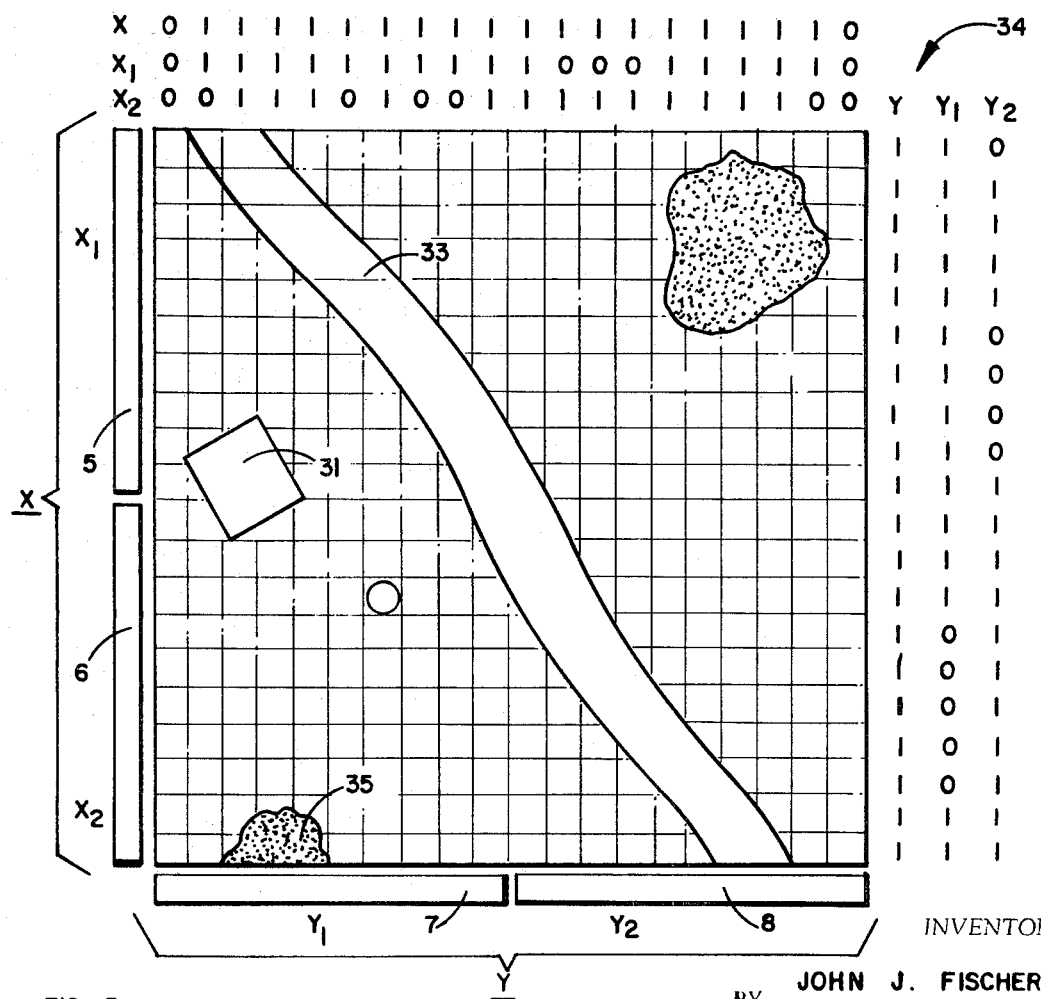
FIG. 3 is a schematic diagram of a second embodiment of a sensor configuration constructed in accordance with the principles of the invention wherein a pair of aligned sensor strips are disposed along each orthogonal axis so as to alternately sweep the same pattern.

The use of a single photosensor strip for the X and Y scans as illustrated in FIG. 1, is not a necessary constraint. FIG. 3 illustrates the use of two aligned photostrips along each axis. Increasing the number of photostrips along a given axis may be advantageous for some applications. For example, a pattern element such as 33 in FIG. 3 may restrict the usefulness of a single strip sensor. This may be readily perceived from an analysis of FIG. 3. For single photosensors, labelled X and Y strips, the words X and Y, respectively, do not provide adequate information as to the nature of the pattern, as a portion of element 33 is present at all Y and substantially all X coordinates. When the strips X and Y are divided into $(X_1, X_2)$ and $(Y_1, Y_2)$, respectively, the resultant patterns $(X_1, X_2)$ and $(Y_1, Y_2)$ provide significantly better information. The determination of the optimum number of subdivisions of the X and Y photosensors will depend in each case on the system requirements as compared to the desirability of increasing the complexity of the photosensors array and associated CIRCUITRY. In addition, a limiting factor is introduced by considering that possible rotation of the photosensor pattern with respect to the track pattern may occur from scan to scan. This means that the X and Y strips do not scan exactly the same pattern area from scan to scan. Thus, as the length of individual subdivisions of X — say $X_i$ — is reduced, a point is reached where $X_i$ scans a somewhat different area each scan, thus introducing errors in to the system which ultimately limits the minimum desirable strip length.

It will be seen that the several embodiments described above provide unique pattern trackers which have distinct and practical advantages. The required sensor and electronic complexity is greatly simplified over prior art devices, allowing for a substantial reduction in size, weight and cost over previous concepts.

While the invention has been described with respect to several physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments but only by the scope of the appended claims.

I claim:

1. A system for determining motion of a pattern comprising in combination:
   detection means for repetitiously scanning the pattern, said detection means comprising:
   a photosensor strip disposed to sense the pattern; and
   drive means for repetitiously providing relative movement, at a known rate, between said photosensor strip and the pattern, thereby causing said photosensor strip to repetitiously scan the pattern;
   means for providing a digital output indicative of said pattern; and
   correlation means for correlating said digital output of a scan with the output obtained by a previous scan, the difference of the digital output of the scans being a function of the motion of the pattern.

2. A system for determining motion of a pattern comprising in combination:
   detection means for repetitiously scanning the pattern, said detection means providing a digital output indicative of the pattern and further comprising an array of at least two orthogonally disposed photosensor strips oriented to sense the pattern;
   drive means for repetitiously providing relative movement, at a known rate, between said sensor array and the pattern, thereby causing said sensor array to repetitiously scan the pattern;
   correlation means for correlating the digital output of a scan with the output obtained by a previous scan, the difference of the digital output of the scans being a function of the motion of the pattern.

3. The system of claim 2 wherein said detector means further comprises:
   digitizing means for receiving the outputs of each of said photosensor strips and comparing each of said outputs to at least one reference level during successive discrete intervals of time during a scan, producing as an output, digital words indicative of the relation of each sensor's output to said reference level during each of said discrete intervals of time.

4. The system of claim 3 wherein said correlation means comprises:
   means for storing the digital words produced by at least two successive scans;
   means for repeatedly shifting the digital words resulting from a later scan in relation to the corresponding digital words resulting from the immediately preceding scan;
   means for comparing the digital words resulting from the later scan to the corresponding words from the immediately preceding scan, said comparison effected for each shifted position of said later scan words.

5. The system of claim 4 wherein said comparing means comprises:
   means for modulo-two adding each bit of a word from a later scan to the corresponding bit of the corresponding word from the immediately preceding scan, said adding means producing an output indicative of the total number of modulo-two additions wherein the corresponding bit values of corresponding words are dissimilar.

6. The system of claim 5 further comprising:

means for determining which shifted position of each later scan word minimizes said adding means output, the number of shifts required to achieve said shifted position being a function of the motion of the pattern between the time of said later and said immediately preceding scan.

7. The system of claim 6 wherein said detector means further comprises:

digitizing means for receiving the output of said photosensor strip and comparing said output to at least one reference level during successive discrete intervals of time during a scan, producing as an output, a digital word indicative of the relation of said sensor's output to said reference level during each of said discrete intervals of time.

8. The system of claim 7 wherein said correlation means comprises:

means for storing the digital words produced by at least two successive scans;

means for repeatedly shifting the digital word resulting from a later scan in relation to the corresponding digital word resulting from the immediately preceding scan;

means for comparing the digital word resulting from the later scan to the corresponding word from the immediately preceding scan, said comparison effected for each shifted position of said later scan word.

9. The system of claim 8 wherein said comparing means comprises:

means for modulo-two adding each bit of the word from said later scan to the corresponding bit of the word from said immediately preceding scan, said adding means producing an output indicative of the total number of modulo-two additions wherein the corresponding bit values are dissimilar.

10. The system of claim 9 further comprising:

means for determining which shifted position of each last scanned word minimizes said adding means output, the number of shifts required to achieve said shifted position being a function of the motion of the pattern in said scan direction between the time of said later and said immediately preceding scan.

11. A method for determining the motion of a pattern comprising in combination:

a. repetitiously scanning the pattern with an array of at least two strip shaped sensors;

b. comparing the output of each of said sensors to a reference level during successive discrete intervals of time during a scan, thereby producing digital words indicative of the relation of each sensor's output to the said reference level during each of said successive discrete intervals of time;

c. correlating by modulo-two addition each corresponding word of a scan to the corresponding word from a previous scan;

d. shifting words of said scan in relation to corresponding words of said previous scan;

e. repeating steps (c) and (d) above and determining the amount of shifting required for maximum correlation.

12. Apparatus for determining the motion of an image of a pattern in the focal plane of a focusing means comprising in combination:

an array of at least two strip shaped photosensor elements;

drive means for repetitiously providing relative movement between said sensor array and the pattern image thereby causing said sensor array to repetitiously scan the pattern image;

digitizing means receiving the output of each of said photosensor elements during each scan and comparing each such output to at least one referenced level during successive discrete intervals of time, said digitizing means providing as an output digital words indicative of the relation of each of said photosensor's outputs to said reference level during each of said discrete intervals of time of a scan;

means for repeatedly shifting the digital words resulting from a later scan in relation to the corresponding words from the immediately preceding scan;

means for modulo-two adding each bit of a word from a later scan to each corresponding bit of the corresponding word from the immediately preceding scan, said adding means producing an output indicative of the total number of additions wherein the corresponding bit values of corresponding words are dissimilar;

means for determining which shifted position of each later scan word minimizes said adding means output, the number of shifts required to achieve said shifted position being a function of the motion of the pattern between the time of said later and said immediately preceding scan.

13. The apparatus of claim 12 further characterized in that said photosensor array comprises:

at least two aligned photosensor strips disposed along each of two coordinate axes.

14. In a telescope tracking system wherein an image of a pattern to be tracked is directed onto the focal plane of the telescope, and wherein said telescope is adapted to dither to sweep the image along a predetermined trajectory across said focal plane, means for determining motion of said pattern in said focal plane comprising:

an array of at least two orthogonally disposed photosensor strips disposed in said focal plane;

means for dithering said telescope to cause said image to repetitiously sweep consecutively across first one and then the other of the photosensor surfaces, thus repetitiously scanning said image across said sensor array;

digitizing means for receiving the outputs of each of said photosensor strips and comparing each of said outputs to at least one reference level during successive discrete intervals of time during the course of a scan, producing as an output, digital words indicative of the relation of each sensor's output to said threshold level during each of said discrete intervals of time;

means for repeatedly shifting the digital words resulting from a later scan in relation to the corresponding digital words resulting from the immediately preceding scan;

means for correlating the digital words resulting from a later scan to the corresponding words from the immediately preceding scan, said correlation effected for each shifted position of said corresponding later scan words;

means for determining which shifted position of said later scan words results in maximum correlation with said corresponding prior scan words, the number of shifts required to achieve said shifted position being a function of the motion of said pattern in said image plane between the time of said later and said immediately preceding scan.

15. The system of claim 14 further characterized in that said sensor array comprises:

at least two aligned photosensor strips disposed along each of two coordinate axes.

* * * * *